Figure 1:
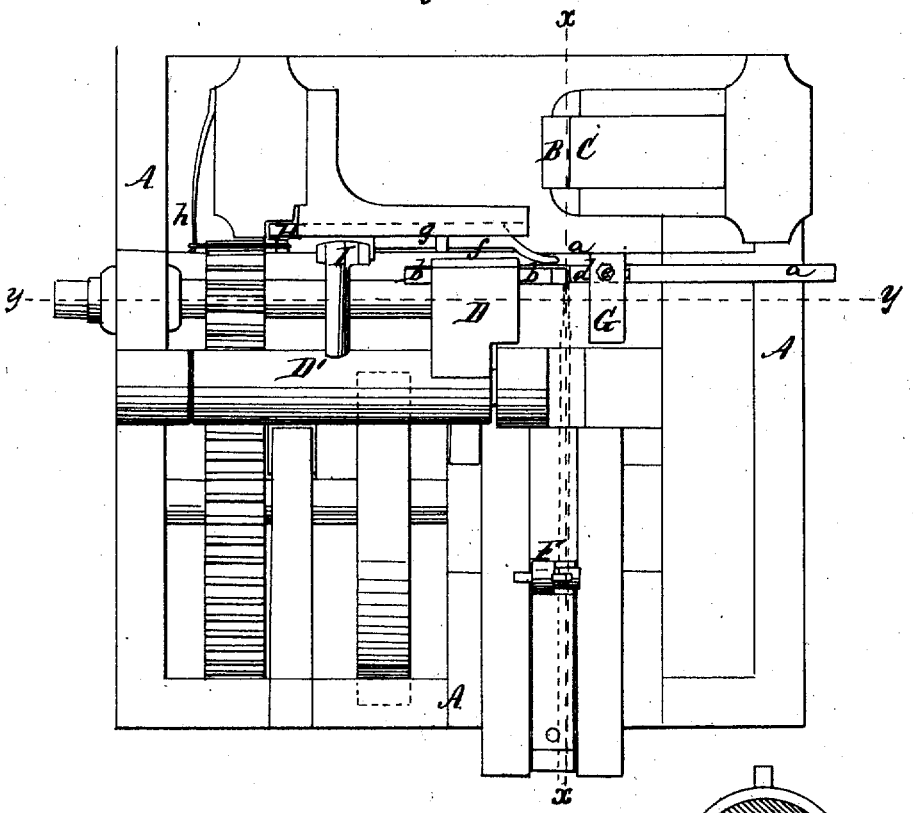

2 Sheets—Sheet 1.

D. DODGE.

MACHINES FOR MAKING HORSESHOE NAILS.

No. 7,435. Reissued Dec. 19, 1876.

Witnesses
H. L. Benneu
Jol M Hicks

Inventor
Daniel Dodge
by his atty
Wm C Hicks

THE GRAPHIC CO. N.Y.

D. DODGE.

MACHINES FOR MAKING HORSESHOE NAILS.

No. 7,435. Reissued Dec. 19, 1876.

Witnesses
W. L. Bennett
Jas M Hicks

Inventor
Daniel Dodge
by his atty
Wm C. Hicks

THE GRAPHIC CO. N.Y.

UNITED STATES PATENT OFFICE.

DANIEL DODGE, OF KEESEVILLE, NEW YORK.

IMPROVEMENT IN MACHINES FOR MAKING HORSESHOE-NAILS.

Specification forming part of Letters Patent No. 41,141, dated January 5, 1864; reissue No. 7,435, dated December 19, 1876; application filed August 10, 1876.

*To all whom it may concern:*

Be it known that I, DANIEL DODGE, of Keeseville, in the county of Essex and State of New York, have invented certain new and useful Improvements in the Manufacture of Nails; and I hereby declare that the following is a full, clear, and exact description of the same, reference being had to the accompanying drawings, making part of this specification.

My invention appertains to that class of nails which are wrought from a rod of about the size of the head of the nail, especially horseshoe-nails.

Nails of the class above referred to, when made by the blacksmith with a hammer over an anvil, are not uniform in shape, size, or length, nor are the points smooth, even, and central with the other part of the shank.

Previous to my present invention attempts had been made to produce horseshoe-nails by forging machinery, and such machinery was so far successful as to make nails having good heads, and shanks of uniform shape and size, excepting the point. Experience has shown, however, that it is not practicable to forge nails having sharp, sound, and uniform points by the means hitherto employed, since, in the process of reducing the point by forging machinery, the blank, being subjected to successive impressions on alternate sides, is reduced to a thin edge in one direction by one impression before it is so reduced in the opposite direction by the succeeding impression. Thus, as the point approaches completion, each impression made by the reducing appliance leaves so great a disproportion between the two dimensions of its cross-section near the point that the metal is crimped or folded on itself by the succeeding impression in the other direction. This crimping or folding, together with the gradual reduction of the temperature of the metal near the point, prevents the forging machinery from bringing the shank to a point, and forms seams in the direction of the length of the nail, causing the end to split and separate when driven into the hoof of the horse, one part sometimes entering the flesh of the foot and doing serious damage. Moreover, it is practically impossible to supply an exactly uniform quantity of metal to the hammers and dies, so as to forge nails with points having uniform lengths on account of the variation in the size and density of the nail-rods, for if the machine be set to supply a given length of a rod of the proper cross-section to form a perfect-pointed nail, if the rod is smaller at any point in its length, or of less density, (as often happens,) there will not be metal enough supplied to make a perfect nail. Besides, it is almost impossible to keep the hammers and dies for forging the points in the proper condition to do perfect work on account of the delicacy of the adjustment necessary and the wear.

The object of my invention is to produce nails free from the before-mentioned objections, and I accomplish this result by first reducing the shank to its finished thickness, leaving its end of sufficient width and body of metal to insure its soundness, and then, while the nail is still under the control of the machine, by cutting off the surplus metal from the side or sides of the end in shearing-dies; thus sharp, uniform points are left, having equal proportional strength with the shank.

My improvements further consist in certain combinations of an anvil and roll for reducing the shank of the nail to its finished thickness, with shearing-cutters for removing the surplus metal near the point, and mechanism for transferring the nail from the anvil to the shearing cutters or dies.

My invention also consists in the combination, with said shearing-cutters, of a moving finger or presser, so arranged in reference to a fixed guide as to press the nail against the guide and hold it in contact therewith and in proper position during the operation of cutting the point, and to so act upon the point, before or during the cutting operation, as to bring it into line with the center of the nail, when the cutting is complete. Said combinations of machinery will be found specifically set forth at the end of this schedule.

To enable others skilled in the art to make and use my invention, I will proceed to describe my improvements, referring to the drawings.

The parts of the machine therein represented, excepting the parts which I have added to complete the combinations above referred to, are substantially, or for the most part, such as are described in my Letters Patent No. 15,054, dated June 3, 1856, No. 25,183, dated August 23, 1859, and No. 25,309, dated August 30, 1859, to which patents I refer.

Figure 2:
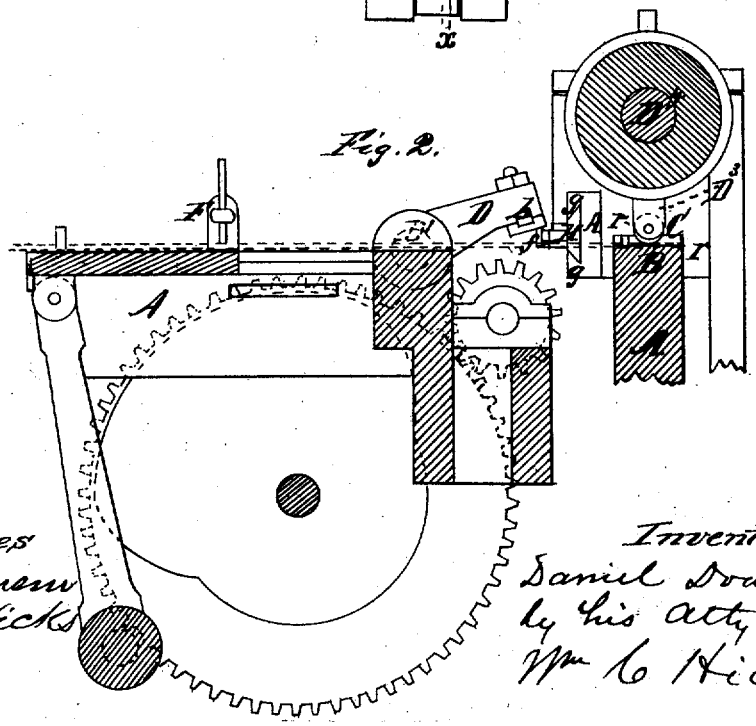
Figure 3:
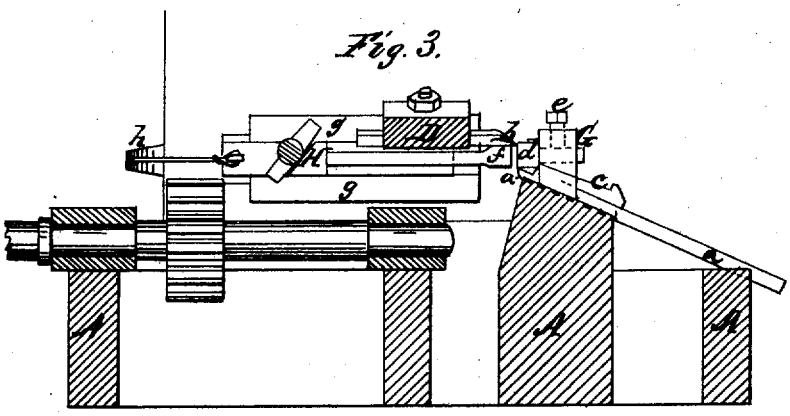
Figures 4, 5, 6:
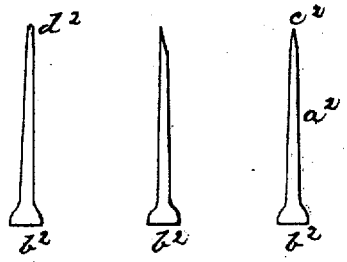
Figure 7:
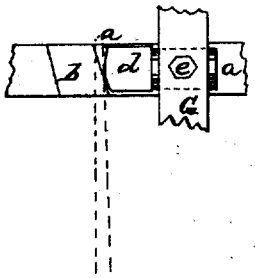

Figure 6 of the accompanying drawings represents my nail complete, $a^2$ being the shank; $b^2$, the head, of about the size of the rod from which it was wrought; and $c^2$, the top view of the point. Fig. 4 represents the form of the top of the nail before the point has been cut. $d^2$ is the metal to be cut away by the shearing-dies. Fig. 5 represents the form of a nail cut to a point on one side, as it would be left by dies shearing one side only without the use of the finger, described hereafter. Fig. 1 is a plan of a sufficient portion of a nail-machine to illustrate my improvements. Fig. 2 is a vertical longitudinal section of the machine, taken close to the principal operating parts, as indicated by the line *x x* in Fig. 1. Fig. 3 is a transverse vertical section of the same on the line *y y* of Fig. 1. Fig. 7 is a top view of one form of pointing-cutters, on a larger scale than Figs. 1, 2, and 3.

A is the framing; B, the anvil; C, the fixed die, having its face at a right angle to the anvil. $D^4$ is the reducing-shaft. Its center of motion is located about at right angles to the face of the anvil. It carries an arm, $D^3$, which, moving with said shaft, causes a roll, *r*, pivoted near its end, to pass lengthwise over the face of the anvil, and to reduce the metal of the nail between said roll and the anvil, the roll *r* revolving by the force of its contact with the surface of the nail. F is the reciprocating griper, which forms part of the subject-matter of Letters Patent No. 25,183, and which, by means of a suitable cam, moves the nail from the anvil to the cutters *a* and *b*, by means of which the point is formed after the nail has been reduced to its finished thickness between the roll *r* and the anvil. *a* and *b*, Figs. 1, 3, and 7, are the cutters by which the surplus metal is cut from the side of the point of the nail to make it of the proper length, and to bring the point to the proper form.

The lower cutter *a* is inserted in a suitable groove provided in the framing, and secured in a fixed position by a key, *c*, as shown in Fig. 3. The said cutters are arranged and operated in the same manner as the cutters described in my Letters Patent No. 25,309, for cutting off the nail—that is to say, the upper cutter *b* is secured in the same vibrating stock or arm D as the cutter which cuts off the nail from the rod, the said stock or arm being carried by a rock-shaft, $D^1$. The latter cutter and the fixed cutter, in connection with which it operates, are neither of them shown, but are to be applied and operated as described in my before-mentioned Letters Patent; but the edges of the cutters *a* and *b*, instead of being at right angles to the line of the nail and nail-rod, are arranged obliquely thereto, so that they will cut the nail in an oblique or slanting direction, as shown in the plan, Fig. 7, and so produce the desired taper and thin point. *d* is the fixed guide, against which the nail is held while the point is being cut. This guide is arranged close above the fixed cutter *a*, in a fixed stock, G, in which it is secured by a set-screw, *e*, but in which it is adjustable transversely to the line of the nail-rod and nail, to allow the nail to come to a proper position over the edge of the cutter *a*. *f* is the finger by which the nail is pushed against the guide *d*, arranged behind the cutters *a* and *b*, on the opposite side of the path in which the nail-rod and nail pass through the machine to that on which the guide *d* is arranged. This finger is attached to a horizontal slide, H, which is fitted to slide in fixed guides *g g*, and which is pushed toward the nail every time the cutters operate by means of an oblique-faced cam or wiper, I, attached to the rock-shaft $D^1$, and afterward drawn back by a spring, *h*, which connects it with the framing of the machine.

The operation of the cutters *a b* and finger *f*, in combination with the anvil and roll *r*, is as follows: After the nail has been drawn out as thin as is desirable by means of the roller *r* and the anvil, its upper and under surface will be finished, and it is then drawn back toward the front of the machine by the reciprocating griper F to a position to be cut at the point. The cutter-stock D descends, and the finger *f* advances toward the portion which is left projecting beyond the guide *d*, and so holds the nail against the said guide while the cutter *b* descends to cut off the surplus metal from the point. The cutters *a b* finish their operation before the cutter which cuts off the nail from the rod completes its operation, and the nail is released from the control of the machine. The finger *f* advances while the cutters *a* and *b* are operating, and presses the point of the nail toward the guide, and brings the taper cut by the cutters *a* and *b* in line with the center of the nail, as shown in Fig. 6.

Without the use of the finger *f*, with the cutters shaped as above described, the nail would be left in the form shown in Fig. 5.

The finger *f* is arranged to push the end of the nail over toward the cutters before they begin to cut, and the point is thus formed in the center of the nail, as in Fig. 6. The machine may be furnished with means for holding the nail in front of the cutters *a b* during the cutting operation.

Instead of a single pair of cutters to cut from one side only of the point of the nail, there may be cutters arranged to cut from both sides of the nail, in which case the point would be produced in the center without the use of the finger *f*, or other device for the same purpose.

I claim—

1. The combination, in a nail-machine, of an anvil for supporting the nail against the pressure of a roll moving over the nail in the direction of its length, and caused to revolve by contact with the surface of the nail, with shearing-dies for shaping the point of the nail, and mechanism for transferring the nail from the anvil to the shearing-dies, substantially as herein set forth.

2. The combination of the finger *f* and the shearing-dies *a* and *b*, substantially as set forth.

Witness my hand this 25th day of July, A. D. 1876.

DANIEL DODGE.

Witnesses:
EDMUND K. BAKER,
E. KINGSLAND.